May 12, 1942.                G. A. DORNIN                2,282,463
                    INGOT MOLD AND INGOT MOLD STOOL
                    Filed Sept. 16, 1941          7 Sheets-Sheet 5

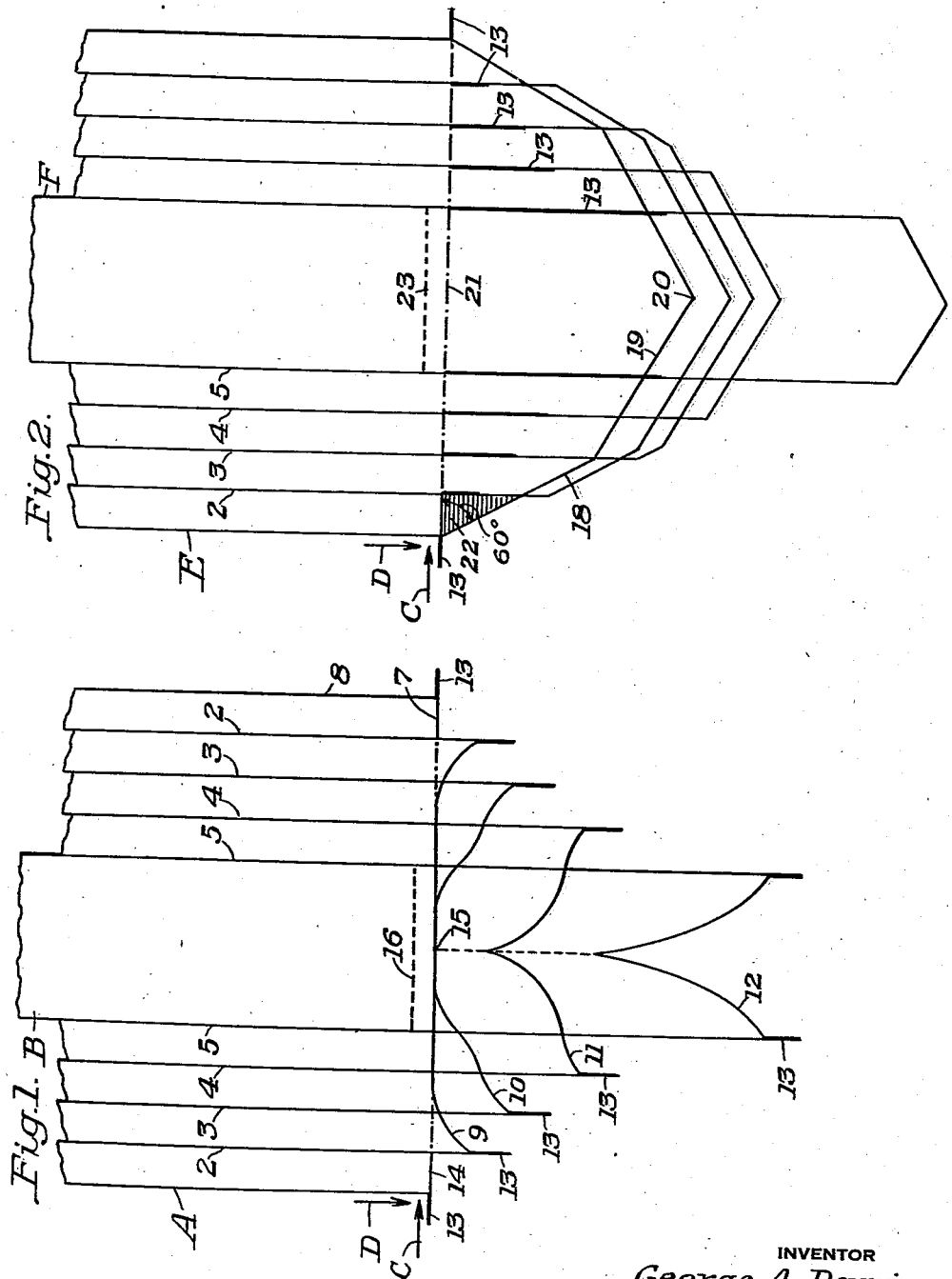

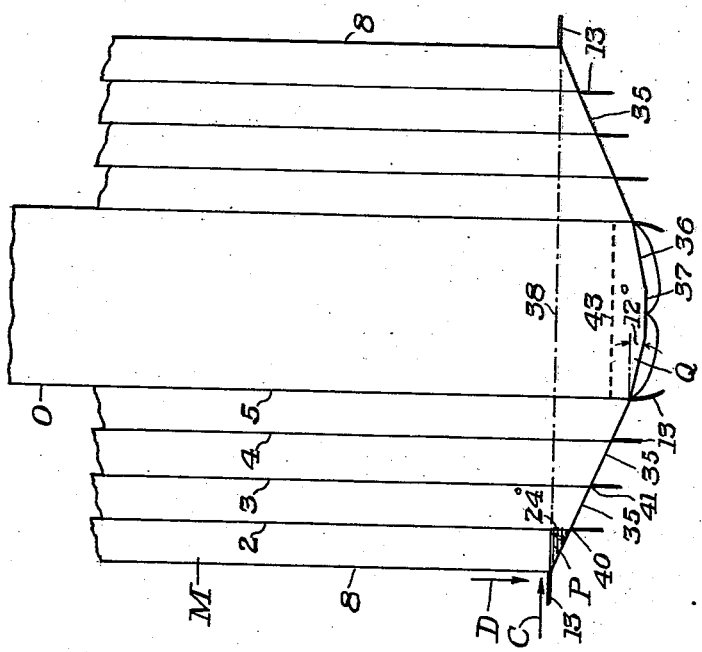
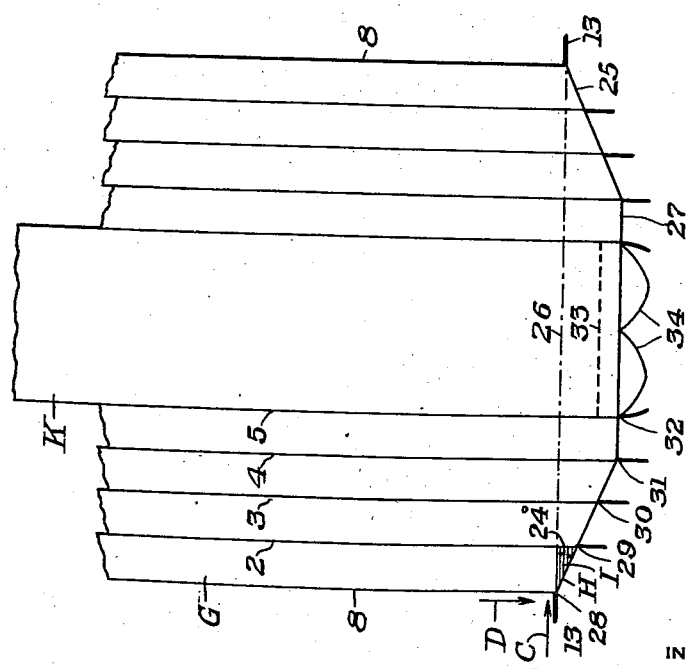

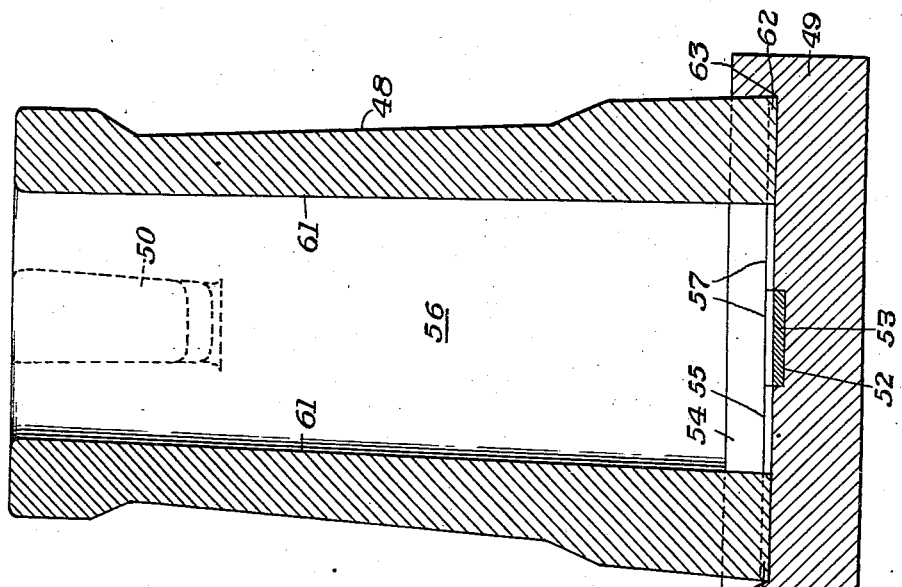
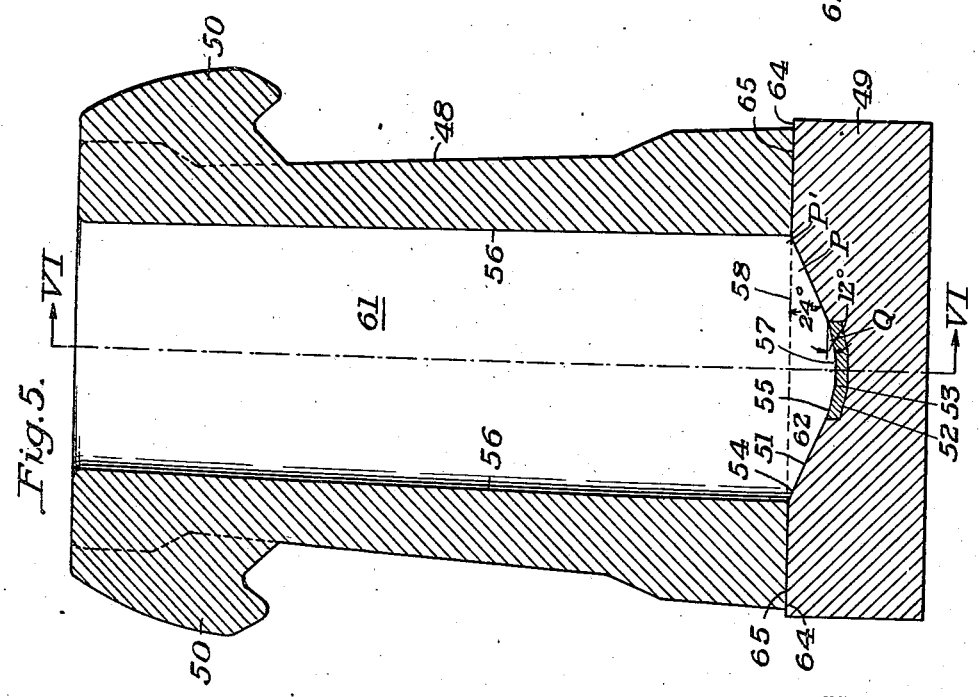

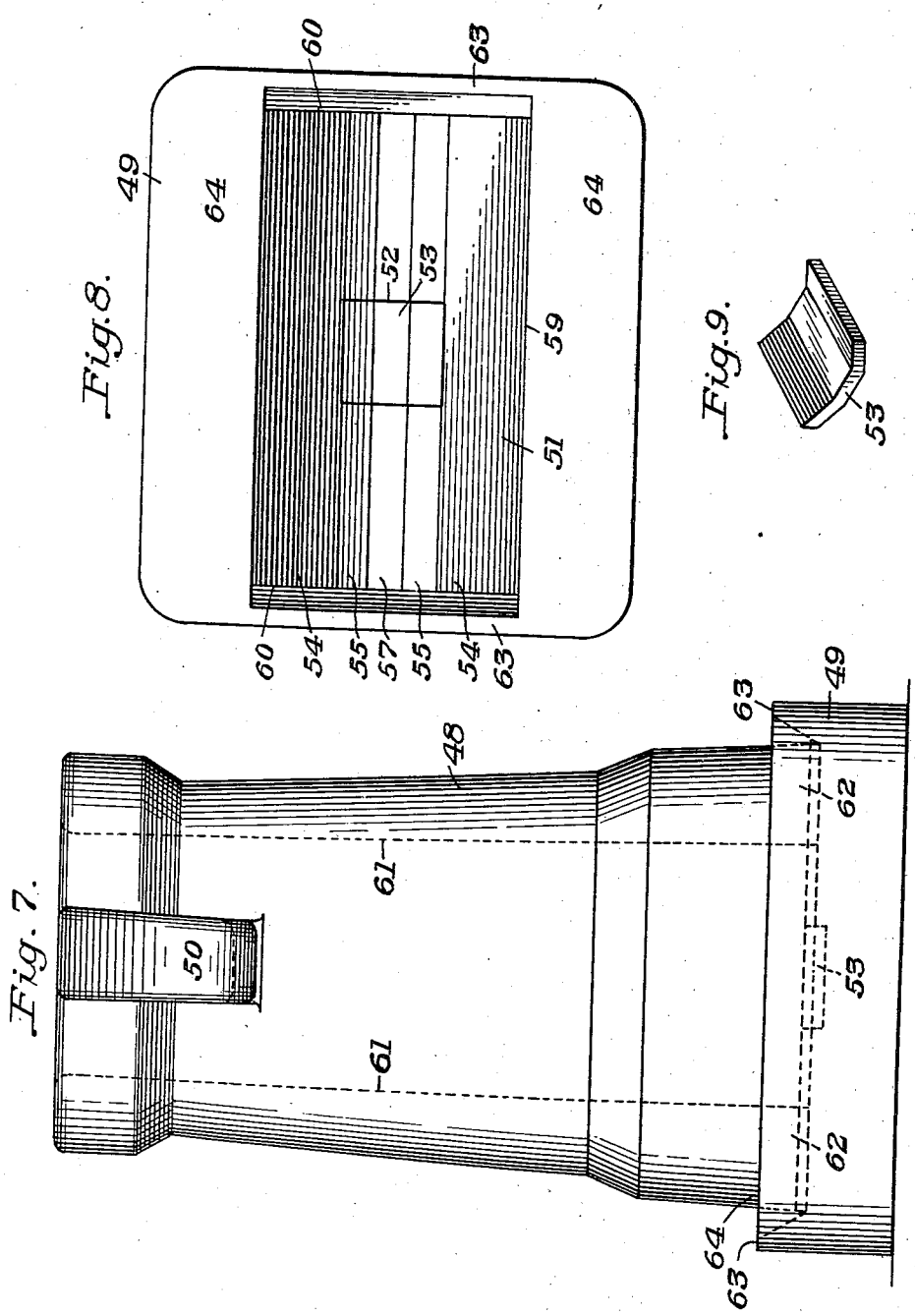

INVENTOR
George A. Dornin
by
Stebbins and Blenko,
His Attys.

May 12, 1942.　　　　G. A. DORNIN　　　　2,282,463
INGOT MOLD AND INGOT MOLD STOOL
Filed Sept. 16, 1941　　　　7 Sheets-Sheet 6

INVENTOR
Geoge A. Dornin
by
Stebbins and Blenko
His Attys.

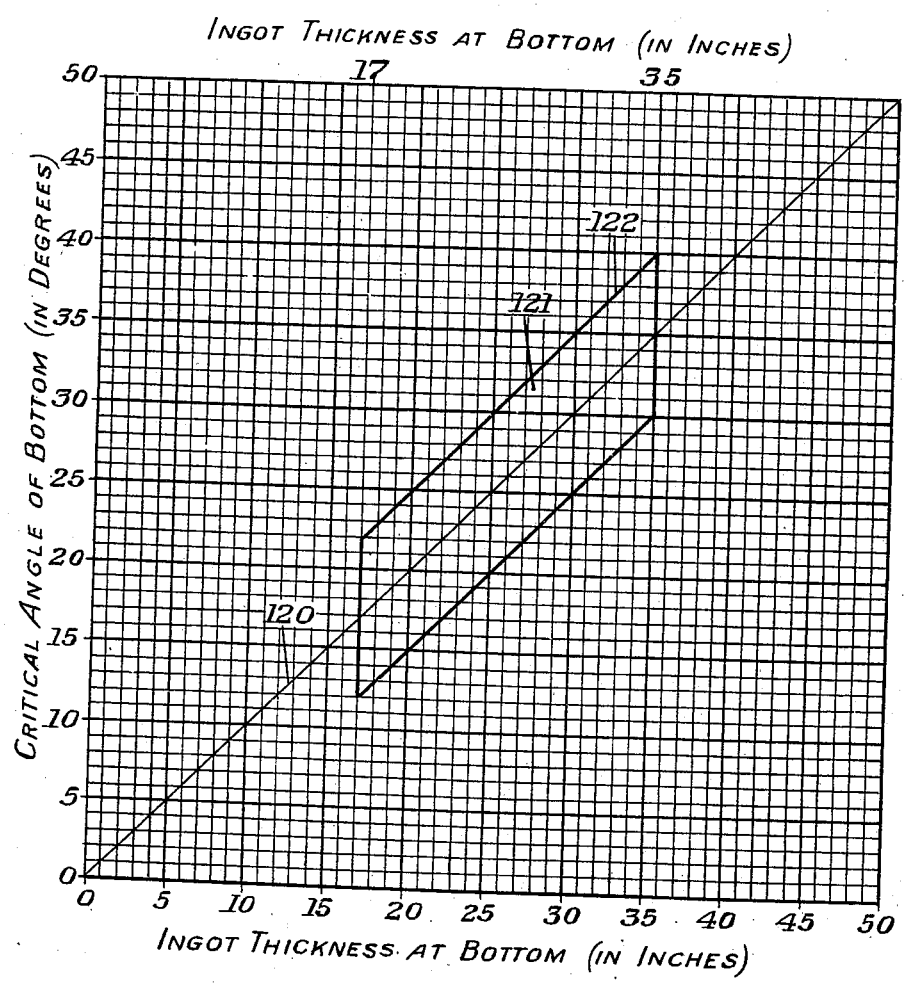

Patented May 12, 1942

2,282,463

UNITED STATES PATENT OFFICE 2,282,463

INGOT MOLD AND INGOT MOLD STOOL

George A. Dornin, Baltimore, Md.

Application September 16, 1941, Serial No. 410,983

7 Claims. (Cl. 22—139)

This invention relates generally to an ingot of special configuration whereby the amount of bottom croppage is materially reduced and to a mold and mold stool for forming the ingot.

The present application is a continuation-in-part of my applications Serial Nos. 312,896, filed January 8, 1940; 350,841, filed August 3, 1940; and 397,061, filed June 7, 1941.

Ingots of the prior art generally have been formed with a flat butt end substantially normal to the axis of the ingot. It is known that such ingots when rolled to reduce their section and elongate them form fish tails which it is necessary to crop off and, therefore, certain attempts have been made to shape the butt end of the ingot in a manner such as to overcome this objectionable feature. It has been proposed, for example, in Patent No. 1,417,246, granted May 23, 1922, to B. P. Haziltine, to provide protuberances on the butt end of the ingot. According to that patent, the protuberance may be either cylindrical or may be a section of a sphere. Where the protuberance includes a section of a sphere, it is pointed out that the curvature of the protuberance is made up of two radii, the radius of the curvature adjacent the sides of the ingot being greater than the radius adjacent the middle of the ingot. In other words, the angle which the protuberance makes with the plane normal to the axis of the ingot and adjacent the periphery of the protuberance is less than the angle between these elements as the center of the ingot is approached. The bottom surface of the protuberance forms with the plane normal to the axis of the ingot angles which increase from the periphery of the bottom surface toward its center.

Although the above mentioned patent and others have suggested the use of a protuberance or convex bottom surface on the ingot for the purpose of preventing fish tailing, none of them has taken into consideration other equally important factors which are involved and which if not solved do not result in a satisfactory ingot. I have found that it is not sufficient simply to provide a convex bottom surface on the ingot. The convex bottom surface must be of such convexity not only as to prevent fish tailing, but as to prevent objectionable scabs on the bloom due either to rolling of the corners or to the rolling of fins produced at the corners, due to the juncture of a mold and stool. If the angle between the convex bottom surface and the side of the ingot is too great, these fins or scabs will cover a material amount of the surface on the bottom end of the rolled product and the discard necessary is frequently greater than that caused by fish tail, thus not only not curing the discard due to fish tail, but actually increasing the loss. I have found, however, that by using the proper angles between the convex bottom surface and a plane normal to the axis of the ingot, I may not only overcome any objectionable amount of fish tailing, but may also materially reduce the portion of the butt end of the ingot over which the objectionable scabs due to rolling down the corners or fins of the ingot will be formed. I may even limit the fish tailing and entirely eliminate the formation of the just mentioned scabs. This angle between the convex bottom surface adjacent the sides of the ingot and a plane normal to the axis I call the critical angle. It is measured in a plane parallel to the axis and normal to the side of the ingot. It may decrease from the periphery of the convex bottom surface toward the center or the critical angles of two opposing sides may be joined by a curve preferably a radius.

In the accompanying drawings, which illustrate several embodiments of my invention, Figures 1 through 4 are diagrammatic illustrations showing the effects of rolling ingots having different shaped bottom ends, these drawings being approximately to scale.

Fig. 1 illustrates the different stages produced by rolling an ingot having a flat bottom surface, substantially a plane normal to the axis of the ingot.

Fig. 2 is a similar view, the ingot having a convex bottom surface in which the angle between the convex surface and the plane normal to the axis of the ingot is too large to produce the desired results obtained by my invention.

Fig. 3 is a similar view illustrating a correct angle between the convex surface and the plane normal to the axis of the ingot.

Fig. 4 is a similar view illustrating the correct angle between the convex bottom surface and the plane normal to the axis of the ingot, the contour of the convex portion being made up of a series of angles decreasing toward the center.

Fig. 5 is a vertical longitudinal section through an ingot mold and an ingot mold stool illustrating one form of my invention.

Fig. 6 is a vertical longitudinal section taken on the line VI—VI of Fig. 5.

Fig. 7 is a side elevation of the mold and stool shown in Figs. 5 and 6.

Fig. 8 is a plan view of the stool shown in Figs. 5 through 7.

Fig. 9 is a perspective view of a removable wear plate which may be placed in a recess in the stool to prevent wear on the stool.

Fig. 10 is a side elevation of the modified ingot mold and ingot mold stool.

Fig. 11 is a vertical section taken on the line XI—XI of Fig. 10.

Fig. 12 is a perspective view of the stool shown in Figs. 10 and 11.

Fig. 13 is a plan view of the stool shown in Figs. 10 through 12.

Fig. 19 is a diagram showing the relationship between the critical angle in degrees and the thickness of the ingot at the bottom in inches.

Figure 10:
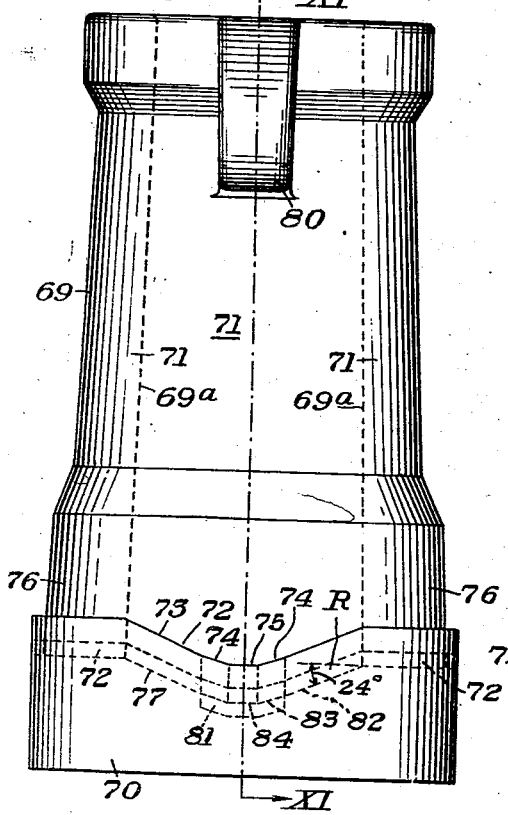
Figs. 10 through 13 illustrate a modified form of the invention.
Figure 11:
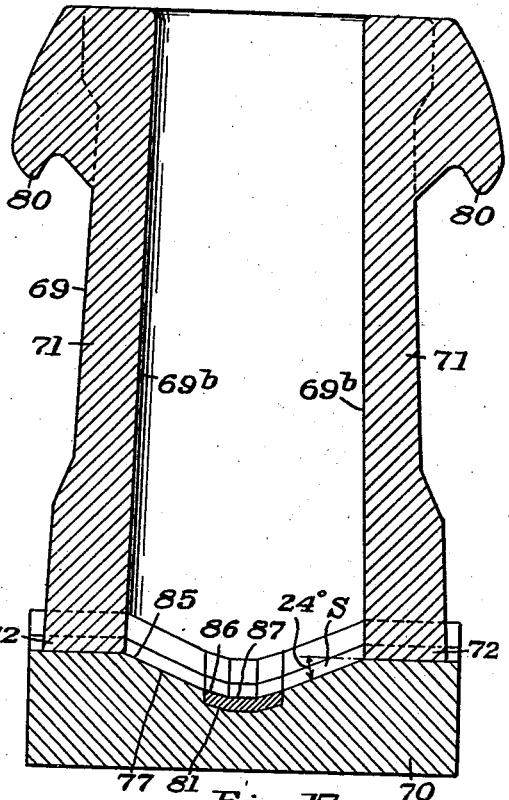

The reasons why the angle between the convex bottom surface and the plane normal to the axis of the ingot must be maintained within certain critical limits will be understood from a consideration of Figs. 1 through 4. Each of these figures illustrate different stages in the reduction of an ingot 24" x 24" section to a bloom approximately 8" x 8". The drawings represent four reduction steps in taking a 24" to an 8" section, each step representing a 4" reduction in the ingot the reduction being ordinarily by two passes through the mill. The size of the ingot after the first reduction step is designated by the reference numeral 2, the size after the second reduction by the reference numeral 3, the size after the third reduction by the reference numeral 4, and the size after the fourth reduction by the reference numeral 5. The rolling results in the reduction of the ingot A to the size and shape indicated by the reference letter B.

The ingot A has a flat bottom 7 which extends substantially normal to the axis of the ingot. The manner in which fish tail is produced on the ingot is illustrated in Fig. 1. At each rolling operation, a certain amount of fishtailing is produced, the amount of fish tailing increasing progressively as indicated by the reference numerals 9, 10, 11 and 12. It will be noted that the ingot A has a fin 13, which was formed at the juncture between the mold and stool. This fin is first bent over and then continues to form a part of the fish tail, as illustrated in the drawing, as the ingot is reduced in section. The formation of the fish tail is believed to be caused for the following reasons:

When an ingot is reduced by a rolling operation, the rolls exert pressure which may be resolved into a vertical component extending normal to the sides of the ingot and a horizontal component extending longitudinally of the ingot. The vertical component is indicated by the reference letter C and the horizontal component by D. In reducing the ingot, the vertical component reduces the section of the ingot and the horizontal component causes it to elongate. It will be seen that with a flat bottom ingot, when the roll approaches the flat bottom, there is no supporting metal below the flat bottom at the portion marked 14 to counteract the horizontal component D. Accordingly the horizontal component D is effective and causes a portion of the metal adjacent the surface to be elongated further than the metal at the center, thereby producing the fish tail 9. The fish tail at this stage of the reduction is small but increases progressively during the succeeding reducing operations, as indicated by the reference numerals 10, 11 and 12, so that when the ingot A has been reduced to the bloom B, there is a very substantial amount of the bottom portion of the bloom which is fish tailed and which it is necessary to crop off. It will be noted that the fish tail extends from the end of the bloom back to the point 15. The line where it is necessary to crop off the bloom is indicated by 16. The amount of metal necessary to crop off varies but is generally about 4% of the total weight of the ingot.

It will be noted that the fin 13 always remains at the apex of the fish tail 9—12 and that the fish tails and the fin move from the plane of the bottom surface of the ingot A progressively lengthwise of the bloom B. At the end of the rolling operation, it is located at the extreme end of the fish tail and the fish tail is considerably below the bottom of the original ingot A.

Referring now to Fig. 2, the ingot E instead of having a flat bottom is formed with a convex bottom formed by the flat surfaces 18 and 19, which converge to the point 20. The surface 18 makes an angle with the dot and dash line 21 drawn normal to the axis of the ingot E of about 60°. The angle of 60°, although being satisfactory from the standpoint of preventing fish tailing of the ingot, is unsatisfactory because it results in the formation of scabs or fins over a large portion of the bottom end of the ingot. As in the case of Fig. 1, the rolling pressure may be resolved into a vertical component C and a horizontal component D. In Fig. 2, however, since the bottom of the ingot has a convex surface, there is a portion of metal extending below the line 21 which counteracts the horizontal component D. This section of metal is indicated by shading and designated by the reference numeral 22. It acts as a support, which counteracts the horizontal component D and prevents the horizontal component from forming any fish tail on the ingot. It will be noted that as the ingot is reduced in section the fin 13 does not move downwardly but always remains with its upper end in the plane of the line 21. However, it is elongated with each reduction. Since the section 22 of supporting metal entirely counteracts any tendency of the horizontal component to form fish tail on the ingot, the only effective pressure is the vertical component C and this merely causes the base of the fin 13 to remain stationary while it is elongated. Thus when the ingot E has been reduced to the bloom F, the fins or the scabs resulting from rolling them or the corners of the ingot, still extend backwardly along the ingot to the line 21 and it is necessary to crop off at approximately the line 23. This croppage in the examples shown amounts to approximately 6% of the total weight of the ingot and is 50% more than the croppage for a normal fish tail as shown in Fig. 1. Thus, although the problem of fish tailing has been overcome by providing the bottom of the ingot with a convex surface, this has introduced another problem which is even more disadvantageous than the production of fish tails itself.

In Fig. 3, the ingot G is provided with a convex bottom surface 25 which forms an angle of about 24° with the line 26 which is normal to the axis of the ingot. The two surfaces 25 are joined by a flat bottom surface 27. This angle of 24° is a proper angle to use in accordance with my invention, but as will be explained later on in connection with Fig. 4, it is preferred to form the convex surface of at least 4 surfaces extending at an angle to the sides of the ingot and to connect these angled surfaces by a flat bottom surface. The angle H, which is approximately 24°, provides a supporting body of metal which has been shaded and is designated by I. In this case also, the vertical component of the roll pressure is indicated by C and the horizontal component by D. The body I of supporting metal is sufficient so that although it prevents fish tailing it is somewhat less than would be required to entirely counteract the horizontal component D. As a result, the horizontal component D is effective to a certain extent and causes the base 28 of the fin 13 to move progressively to the points 29, 30, 31 and 32 as the rolling progresses. In this way, the fin instead of remaining with its base in the plane of the line 26 moves toward the bottom end of the ingot, so that when the ingot G has been reduced to the bloom K the fin is located near the bottom end of the bloom, as indicated by the reference numeral 32. Accordingly it is necessary to crop off only a much less amount of the bloom than was the case of the bloom produced in accordance with Fig. 2. The bloom may be cropped at the line 33.

In Fig. 3, it will be noted that the surface 27 is flat and substantially normal to the axis of the ingot. When the ingot G has been reduced down to the size indicated by the reference numeral 4, we then have in effect a flat bottomed ingot and further reduction results in fish tailing of a character somewhat similar to that shown in Fig. 1. The character of the fish tailing is modified by the fact that in reducing the ingot 4 to the bloom 5 a large percentage reduction is made. This heavy reduction has the effect of bulging the end of the bloom, so that it takes the shape indicated by the reference numeral 34. In order to further decrease this tendency to fish tail or to bulge after the reduction has been carried out to a certain extent, I preferably employ a convex bottom surface on the ingot of the shape illustrated in Fig. 4.

Referring now to Fig. 4, the ingot M is reduced to the bloom O in a manner similar to that previously described. The bottom convex surface of the ingot is made up of a plurality of flat surfaces 35 and 36 extending at angles to the axis of the ingot, the surfaces 36 being joined by a flat surface 37. This surface 37 is preferably comparatively short and is usually not over 8% of the original ingot section. The angle P between the surface 35 and the horizontal line 38 is approximately 24° and the angle Q between the surfaces 36 and the line 38 is approximately 12°. I may use any number of surfaces to make up the convex shape of the bottom end of the ingot and in those cases where a very large number of flat surfaces are employed the shape would approximate a curve.

As the ingot M is reduced in size progressively to sizes 2 and 3, the fin 13 moves progressively to the positions 40 and 41. The movement here is similar to the movement explained in connection with Fig. 3. That is, the supporting metal adjacent the apex of the angle P is insufficient to counteract all of the horizontal component D of the rolling pressure and accordingly the base of the fin 13 moves lengthwise of the ingot to the positions 40 and 41. It will be noted that in the embodiments illustrated, each reducing step reduces the section about 4". As the reducing steps progress, the percentage of reduction for each step, therefore, increases. As the percentage of reduction increases, the tendency to fish tail becomes less and the tendency to form a bulb on the end of the ingot increases. For example, if a press were used instead of a roll and the ingot being reduced had a flat bottom, the reduced product would have a bulb on its end instead of a fish tail. That is, as the percentage of reduction is increased, the tendency to fish tail is decreased, the tendency to form a bulb on the end of the ingot is increased and the effect of the horizontal component D decreases. As shown in Fig. 4, I may crop the bloom approximately at the line 43, so that the croppage amounts to only about 1% of the ingot weight.

It will be seen that the angle P shown in Fig. 4 must be maintained within certain limits, in order to produce the desired results. If the angle is too small, the ingot will fish tail. On the other hand, if it is too large, it will result in the fin or corner simply traveling inwardly toward the center of the ingot without moving progressively lengthwise thereof as the reduction proceeds, and it will be necessary to crop off a large amount of the ingot. In reducing a 24" ingot by percentages such as are common in commercial practice today, I prefer to make the angle P about 24° and the angle Q about 12°. These angles will vary according to the initial size of the ingot and the percentage of reduction in the various passes. If the initial ingot section is less than 24" or the percentage of reduction per pass is greater in proportion than commonly employed, I would reduce the angle P and the angle Q. On the other hand, if the initial ingot was greater than 24", or if the reduction per pass was less than commonly used in commercial practice, I would increase the angles P and Q. When the convex surface is made up of two surfaces such as 35 and 36 extending at angles to the line 38 as shown in Fig. 4, the angle Q should be approximately one-half the angle P. Where there are three surfaces between a side of the ingot and the surface at the center of the ingot which is normal to the axis of the ingot, the other angles Q should be about two-thirds of P, one-third of P, respectively, and so on.

I have found that the critical angle P which should be used bears a relationship to the thickness of the ingot which is to be reduced. From extensive experiments which I have carried out on a very large tonnage of ingots, I have found that the critical angle as expressed in degrees should be approximately equal to the thickness as expressed in inches of the bottom end of the ingot. Thus, as previously mentioned, in a 24" x 24" ingot, the critical angle is preferably about 24°. In a like manner, in a 24" x 36" ingot, the critical angle is preferably about 24°. In an 18" x 25" ingot, it is preferably about 18°. It follows that the critical angles will vary according to the initial thickness of the ingot, but there should always be the proper relationship between the thickness of the ingot and the critical angle.

The critical angle need not be exactly equal to the thickness of the ingot but need be only approximately so. Furthermore, it is the thickness of the ingot at the bottom of the ingot which is to be considered, irrespective of whether the ingot is big end down or big end up. In carrying out my invention, the critical angle as expressed in degrees is generally equal to the thickness of the bottom end of the ingot as expressed in inches, plus or minus about 5°.

Referring to Fig. 19, the relationship between the critical angle and the thickness of the bottom end of the ingot is shown. As shown in this figure, the preferred critical angle for ingots of different thicknesses is represented by the line 120. It will be noted, for example, that an ingot which is 24" thick at the bottom preferably has a critical angle of 24°. Since this preferred critical angle may vary somewhat according to particular conditions, such as percentage of reduction per pass, I have represented by the area 121, enclosed by the parallelogram, 122, the approximately permissible variations in critical angles for ingots of various thicknesses. I have found that generally the critical angle as expressed in degrees should not be more than about 5° greater, nor less than about 5° less, than the thickness of the bottom of the ingot as expressed in inches. This permissible variation is represented by the parallelogram 122, which includes ingots of different sizes having thicknesses of 17 to 35". As shown by the enclosed area 121, the critical angle for an ingot having a thickness of 24" should not be greater than about 29° and should not be less than about 19°. In a similar manner, an ingot which is 17" thick should have a critical angle not greater than 22° nor less than 12° and in an ingot having a thickness of 35" the critical angle should not exceed about 40° and should not be less than about 30°.

Referring now more particularly to the accompanying drawings and for the present to Figs. 5 through 9, which illustrate one form of the invention, an ingot mold 48 and an ingot mold stool 49 are shown. The ingot is square in cross section and tapers slightly from the bottom to the top. The ingot may, however, be of other shape than square. It may have two broad sides and two narrower sides, particularly in those cases where the ingot is to be rolled into slabs. The mold is provided with the usual lugs 50 for raising the mold after the ingot has been cast. The ingot has not been shown in the mold but of course will be of the contour of the cavity provided by the mold and the mold stool.

Referring to Fig. 5, the stool is provided with a cavity indicated generally by the reference numeral 51, which forms a convex bottom surface on the ingot. In order to prevent wear on the surface of the stool, it is provided with a recess 52 which receives a removable wear plate 53 illustrated in Fig. 9. When the ingot is cast, the wear plate sticks to the end of the ingot but is knocked off during handling or rolling or is cut off with the bottom crop and another wear plate is placed in the recess in the stool before another ingot is cast. The present invention relates particularly to the shape of the convex bottom surface formed on the butt end of the ingot and is applicable whether or not removable wear plates are provided for the stool.

As shown particularly in Figs. 5 and 8, the cavity 51 in the stool is formed of flat surfaces 54 and 55, which extend at an angle to the plane 58 normal to the axis of the ingot. The two surfaces 55 are connected by a flat surface 57, which is normal to the axis of the ingot. The angle P between the surface 54 and the plane 58 normal to the axis of the ingot is approximately 24°. The angle Q between the surface 55 and the plane 58 normal to the axis of the ingot is approximately 12°—that is, about one-half of the angle P.

The cavity 51 in the stool is rectangular in shape, having two long sides 59 and two short sides 60, as shown in Fig. 8. The two opposite sides 61 of the mold are each formed with a downwardly extending projection 62, as shown in Fig. 5, which projections are located intermediate the corners of the mold. These projections 62 have their lower surfaces conforming to the shape of the cavity in the stool, so that the sides 61 of the mold fit into the cavity and prevent displacement of the mold and stool in one direction. At each end of the stool is a flange 63, which acts to center the mold on the stool in the other direction. As shown in Fig. 8, the cavity in the stool is surrounded by a border made up of two flanges 63 at the ends and two flat surfaces 64 at the sides. The sides 56 of the mold have flat bottom surfaces 65, which are supported on the flat portion 64 of the stool. Thus the two opposite sides 56 of the mold rest on the broader portion 64 of the stool while the projections 62 at the lower ends of the sides 61 of the mold fit into the cavity 51 in the stool.

Referring now to the embodiment illustrated in Figs. 10 through 13, a mold 69 is supported on a stool 70. The mold has four sides 71, each of the sides being of the same configuration. The bottom edge of each side of the mold is formed with a projection 72 made up of the surfaces 73, 74 and 75, this projection being located intermediate the corners 76 of the mold. The surfaces 73, 74 and 75 of the mold conform respectively to the surfaces 73', 74' and 75' in the border of the stool. The corners 76 of the mold rest on the corners 76' of the stool.

The cavity 77, which forms the convex bottom on the ingot, is so shaped that the bottom of the ingot is convex in shape when viewed from any of its sides. This type of ingot and mold is preferably used where the ingot is to be reduced materially both in thickness and width, whereas the ingot produced in the molds shown in Figs. 5 through 8 is intended primarily for use where most of the reduction is to be performed on two sides of the ingot and only a relatively small amount of reduction is performed on the other two sides. The ingot mold is provided with lifting lugs 80 and with a removable wear plate 81.

Cavity 77 in the stool is formed by the surfaces 82 and 83, which extend at angles to the sides 69a of the mold. The surfaces 83 are joined by a flat surface 84. The surface 82 makes an angle R of 24° with the plane normal to the axis of the ingot. The surface 83 makes a smaller angle with the plane normal to the axis than does the surfaces 82.

The cavity 77 also has the surfaces 85 and 86 extending at angles to the horizontal, the surfaces 86 being joined by a flat surface 87 extending normal to the axis of the ingot. The surface 85 makes an angle S of 24° with the plane normal to the axis of the ingot. The angle which the surface 86 makes with the horizontal is less than that between the surface 85 and the horizontal.

The ingot produced in the mold of Figs. 5 through 8 has a convex bottom surface when the section is taken in a plane extending through two sides of the ingot. When the section is taken in a plane through the other two sides of the ingot, the bottom surface is a straight line. This type of ingot is particularly useful where most of the reduction is to be performed on the two sides of the ingot which are joined by the convex surface, such as in producing slabs from ingots having two broad sides and two narrow sides.

The ingot produced in the mold shown in Figs. 10 through 13 has a convex bottom surface in a plane through two sides of the ingot and also a convex bottom surface in a plane taken through the other two sides of the ingot. This type of ingot having a compound convexity is particularly useful where the ingot is to be reduced to a materially smaller section in both directions by working upon all four sides of the ingot.

Figure 14:
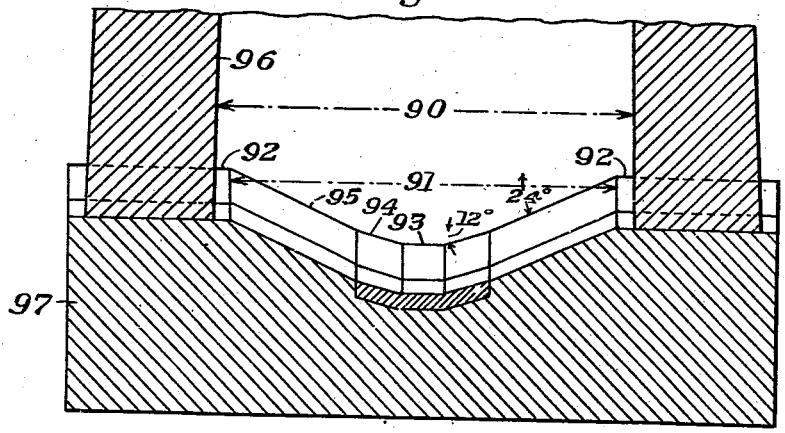
Fig. 14 is a vertical longitudinal section of the lower end of an ingot mold and ingot mold stool illustrating a modified form of the invention.

In the embodiments thus far described (see Figs. 5 and 11), the cavity in the mold steel which forms the convex bottom surface on the ingot is co-extensive with the cross-sectional area of the mold where it seats on the mold stool. In other words, as shown in Fig. 5, the outer edge of surface 54 of the mold cavity lies flush with the wall 56 of the mold. It is not necessary, however, in all cases that the cavity in the stool be co-extensive with the area of the ingot mold. I may, for example, employ the present invention in connection with a mold and stool as shown in Fig. 14. In this embodiment, the width 90 of the cavity in the mold is greater than the width 91 of the cavity in the stool, so that there is a ledge 92 on the stool. The cavity in the stool is formed by a series of surfaces 93, 94 and 95 similar respectively to the surfaces 87, 86 and 85 shown in Fig. 11. The surfaces 95 form angles of 24° with the plane normal to the axis of the ingot mold. In referring in the claims to "the bottom surface adjacent the sides of the ingot," it is intended to include not only an arrangement such as shown in Fig. 5, in which the outer edge of the surface 54 lies flush with the inside wall 56 of the mold— i. e. flush with the side of the ingot—but also an ingot produced in an apparatus such as shown in Fig. 14. In Fig. 14, the surface 95 is spaced from the inside wall 96 of the ingot mold by the width of the ledge 92. An ingot produced in this apparatus will have a ledge corresponding to the ledge 92 between the sides of the ingot and the convex bottom portion of the ingot.

Although it is preferred in most cases to have the outer edge of the surface 95 flush with the surface 96, some of the benefits of my invention may be obtained in a construction such as shown in Fig. 14. The ledge 92 ordinarily should not be over about 1" or 2" in width, because if the ledge is made wider than this, there is danger of the ingot fish-tailing in rolling. I might, for example, use a 20" mold stool with either a 20" mold or a 22" mold. In the former case, the outer edges of the surfaces 95 would lie flush with the inner wall of the mold, whereas in the latter case there would be a ledge such as the ledge indicated by the reference numeral 92.

Figure 12:
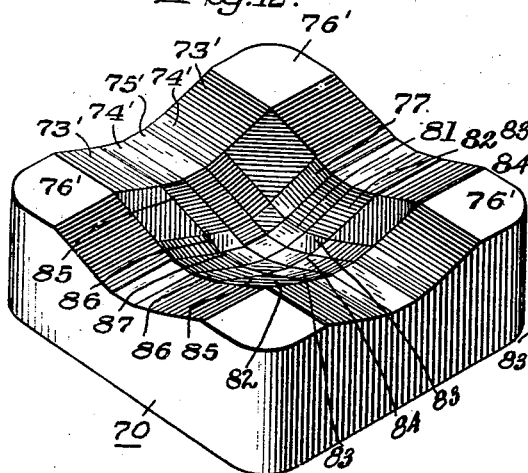
Figure 13:
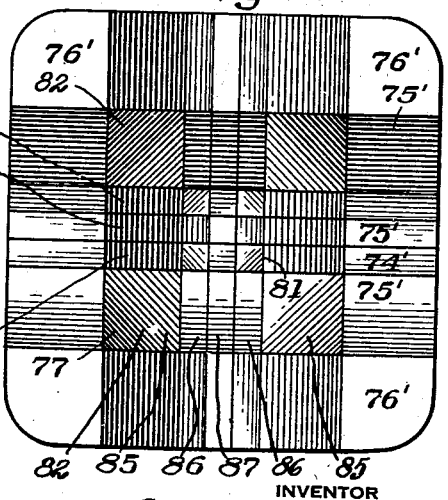
Figure 15:
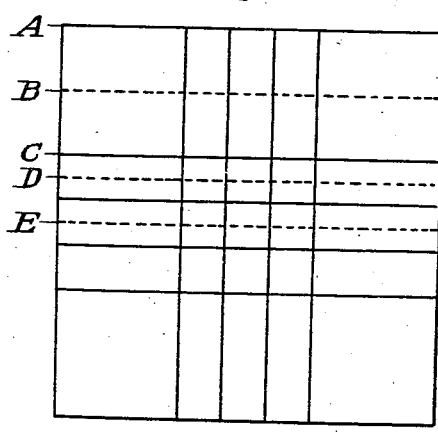
Fig. 15 is a diagrammatic plan view of the cavity portion of the ingot mold stool shown in Fig. 12.
Figure 17:
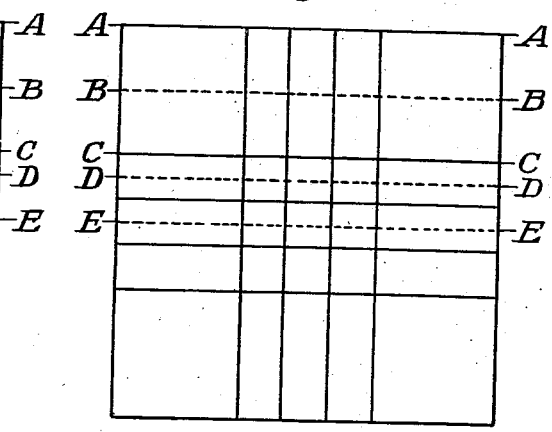
Fig. 17 is a diagrammatic plan view of the cavity portion of a modified form of ingot mold stool.
Figure 16:
Fig. 16 illustrates a series of vertical contours of the ingot mold stool as represented by the section lines indicated on Fig. 15.
Figure 18:
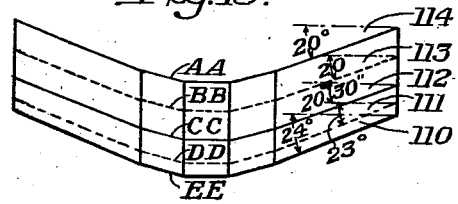
Fig. 18 illustrates a series of vertical contours of the ingot mold stool as represented by the section lines indicated on Fig. 17.

In the mold stool shown in Fig. 12, vertical sections taken parallel to the sides of the stool at the center of the stool and at various distances from the center all will have the same contour. This is indicated in Figs. 15 and 16 in which the contour lines A—A, B—B, C—C, D—D and E—E of Fig. 16 represent the contours taken along the corresponding section lines of Fig. 15. The surface 100 has the same inclination to the horizontal, i. e. the same inclination to the plane normal to the axis of the mold, whether the section through the stool be taken through the center of the stool, as indicated by the line E—E, or through an edge of the mold cavity, as indicated by the line A—A, or through any intermediate section. Thus in Fig. 16 all of the angles 101, 102, 103, 104 and 105 are 24°. In a similar manner, the contour lines representing sections taken at right angles to the sections A—A, B—B, C—C, D—D and E—E all have the same inclination to the horizontal. This arrangement is satisfactory where the ingot is to be rolled between cylindrical rolls. Where, however, the ingot is to be rolled extensively through collared passes, it is preferred that the angle which the surface of the cavity adjacent the sides of the ingot mold makes with the horizontal be less at and adjacent the corners of the ingot than it is at and adjacent the middle of the sides of the convex end of the ingot. Such an arrangement is illustrated in Figs. 17 and 18. As here shown, the contour line E—E which represents a section through the middle of the ingot makes an angle 110 of about 24° with the horizontal. The contour lines D—D, C—C, B—B and A—A make the angles respectively 111, 112, 113 and 114 of 23°, 20°30″, 20° and 20°.

The critical angle between the surface of the cavity and the plane normal to the axis of the ingot may be the same at the middle of the sides of the ingot and at the corners of the ingot and at all points therebetween, as shown in Figs. 12 and 16; or the angle may decrease from the middle of the sides of the ingot toward the corners, as shown in Fig. 18. It is essential according to the present invention that the critical angle be used at the middle of the side of the ingot. In certain cases, it is desirable that the critical angle be used throughout a major portion of the whole ingot section.

The invention is not limited to the preferred embodiments, which have been given merely by way of example, but may be otherwise embodied or practiced within the scope of the following claims.

I claim:

1. Apparatus for casting ingots, comprising an ingot mold and an ingot mold stool, the stool having a cavity for forming a convex bottom surface on an ingot, each of the angles between the surface of the cavity adjacent the sides of the ingot mold which define the thickness of the ingot and the plane normal to the axis of the ingot mold, as expressed in degrees, when said angle is measured in a plane parallel to the axis of the ingot mold and normal to said sides of the ingot mold, being approximately equal to the thickness, as expressed in inches, of the bottom end of the ingot mold cavity.

2. Apparatus for casting ingots, comprising an ingot mold and an ingot mold stool, the stool having a cavity for forming a convex bottom surface on an ingot, each of the angles between the surface of the cavity adjacent the sides of the ingot mold which define the thickness of the ingot and the plane normal to the axis of the ingot mold, as expressed in degrees, when said angle is measured in a plane parallel to the axis of the ingot mold and normal to said sides of the ingot mold, being equal to the thickness, as expressed in inches, plus or minus 5°, of the bottom end of the ingot mold cavity.

3. Apparatus for casting ingots, comprising an ingot mold and an ingot mold stool for casting an ingot having a thickness not less than about 17″ and not more than about 35″, the stool having a cavity for forming a convex bottom surface on an ingot, each of the angles between the surface of the cavity adjacent the sides of the ingot mold which define the thickness of the ingot and the plane normal to the axis of the ingot mold, as expressed in degrees, when said angle is measured in a plane parallel to the axis of the ingot mold and normal to said sides of the ingot mold, being equal to the thickness, as expressed in inches, plus or minus 5°, of the bottom end of the ingot mold cavity.

4. Apparatus for casting ingots, comprising an ingot mold and an ingot mold stool, the stool having a cavity for forming a convex bottom surface on an ingot, each of the angles between the surface of the cavity adjacent the sides of the ingot mold and the plane normal to the axis of the ingot mold, as expressed in degrees, when said angle is measured in a plane parallel to the axis of the ingot mold and normal to said sides of the ingot mold, being equal to the thickness, as expressed in inches, plus or minus 5°, of the bottom end of the ingot mold cavity.

5. Apparatus for casting ingots, comprising an ingot mold and an ingot mold stool, the stool having a cavity for forming a convex bottom surface on an ingot, each of the angles between the middle of the surface of the cavity adjacent the sides of the ingot mold which define the thickness of the ingot and the plane normal to the axis of the ingot mold, as expressed in degrees, when said angle is measured in a plane parallel to the axis of the ingot mold and normal to said sides of the ingot mold, being equal to the thickness, as expressed in inches, plus or minus 5°, of the bottom end of the ingot mold cavity.

6. Apparatus for casting ingots, comprising an ingot mold and an ingot mold stool, the stool having a cavity for forming a convex bottom surface on an ingot, each of the angles between the middle of the surface of the cavity adjacent the sides of the ingot mold which define the thickness of the ingot and the plane normal to the axis of the ingot mold, as expressed in degrees, when said angle is measured in a plane parallel to the axis of the ingot mold and normal to said sides of the ingot mold, being equal to the thickness, as expressed in inches, plus or minus 5°, of the bottom end of the ingot mold cavity, these angles decreasing toward the corners.

7. Apparatus for casting ingots, comprising an ingot mold and an ingot mold stool, the stool having a cavity for forming a convex bottom surface on an ingot, each of the angles between the major portion of the surface of the cavity adjacent the sides of the ingot mold which define the thickness of the ingot and the plane normal to the axis of the ingot mold, as expressed in degrees, when said angle is measured in a plane parallel to the axis of the ingot mold and normal to said sides of the ingot mold, being equal to the thickness, as expressed in inches, plus or minus 5°, of the bottom end of the ingot mold cavity.

GEORGE A. DORNIN.